W. F. MEYERS.
STONE CUTTING MACHINE.
APPLICATION FILED JAN. 22, 1909.
939,528.
Patented Nov. 9, 1909.
2 SHEETS—SHEET 2.
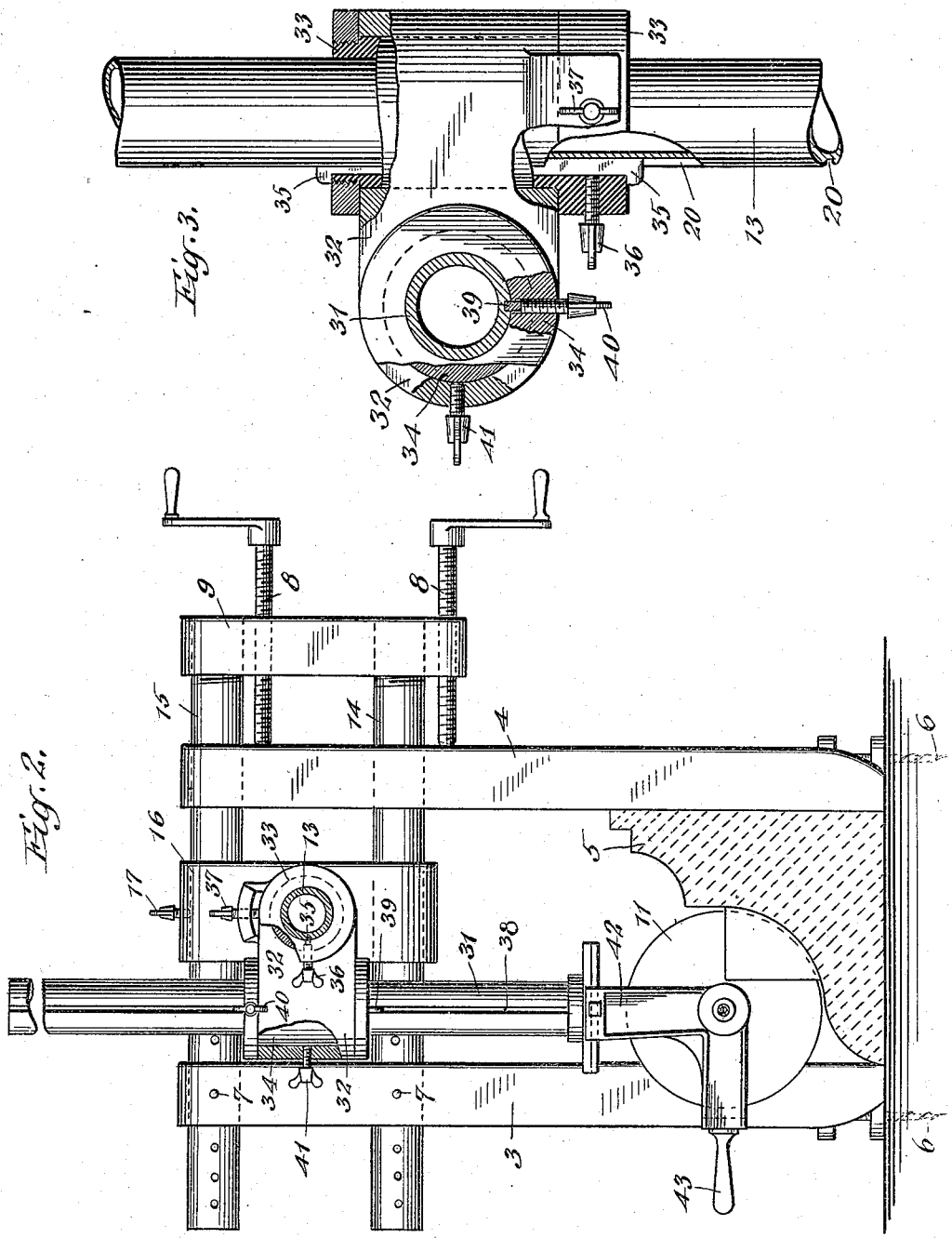
WITNESSES
INVENTOR
Willard F. Meyers
BY
Henry L. Williams
ATTORNEY

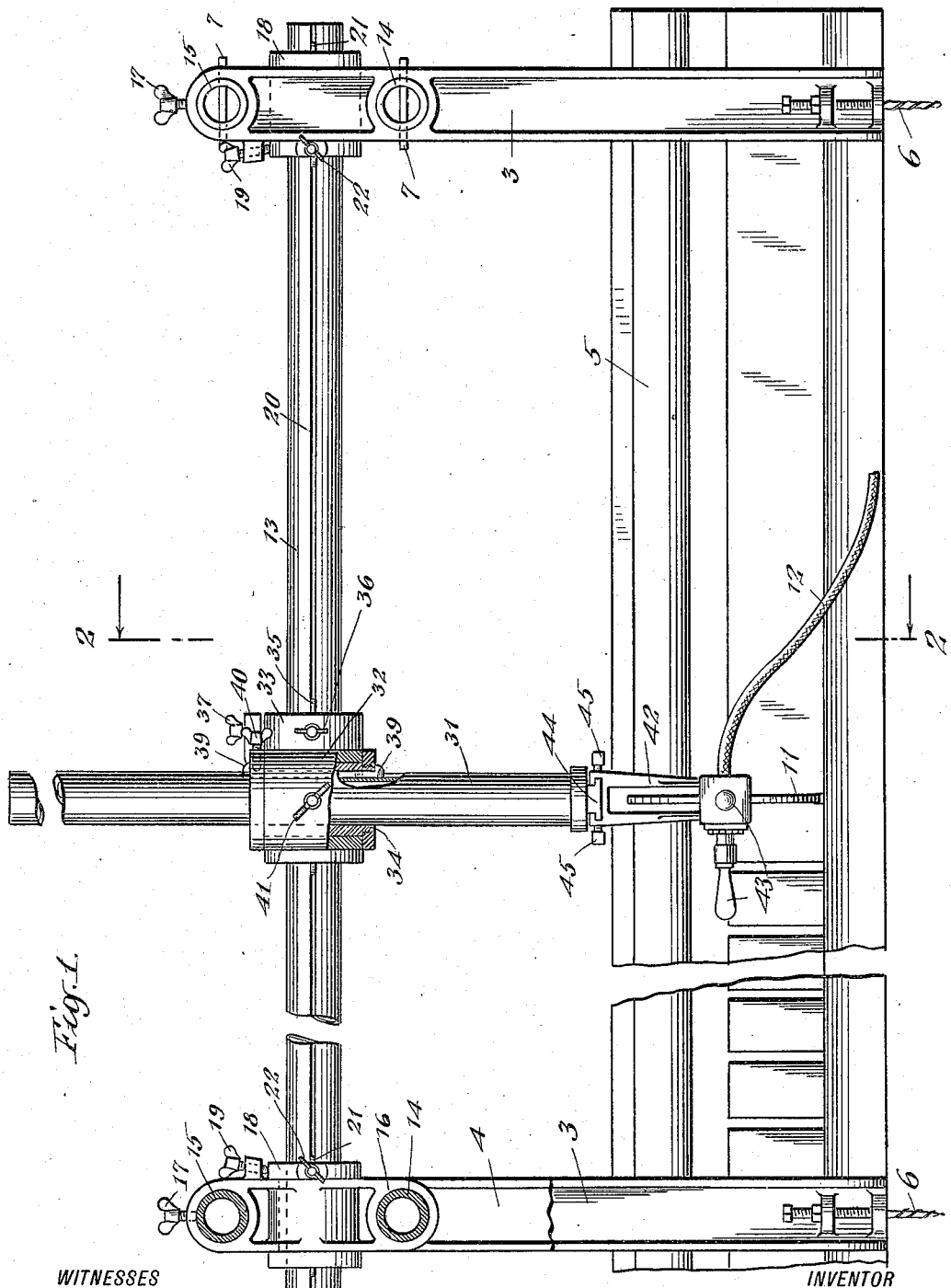

UNITED STATES PATENT OFFICE.

WILLARD F. MEYERS, OF NEW YORK, N. Y.

STONE-CUTTING MACHINE.

939,528.  Specification of Letters Patent.  Patented Nov. 9, 1909.

Application filed January 22, 1909. Serial No. 473,698.

*To all whom it may concern:*

Be it known that I, WILLARD F. MEYERS, a citizen of the United States, residing at Long Island City, borough of Queens, city of New York, in the county of Queens and State of New York, have invented a certain new and useful Improvement in Stone-Cutting Machines, of which the following is a specification, reference being had therein to the accompanying drawings, forming part thereof.

My invention relates to stone cutting machines and particularly to machines for cutting or sawing dentils and other ornaments in stone cornices and the like.

One object of my invention is to facilitate the cutting of such ornaments by providing means whereby the tool may be readily presented to the work in any position at any desired place while maintaining rigidity of the parts.

Other objects are compactness, durability, and reliability and facility of operation.

My invention also includes many advantageous features and details of construction, as will hereinafter appear.

I shall now describe my invention with reference to the accompanying drawings and shall thereafter point out my invention in claims.

Figure 1 is a front elevation of my improved stone sawing machine with parts broken away. Fig. 2 is a sectional elevation taken on the line 2—2 of Fig. 1, looking toward the left. Fig. 3 is an enlarged detail plan of the tool carrier and its connection with the cross-bar, partly in section.

In the embodiment of my invention shown in the drawings, I employ as a cutting tool a rotary saw 11 driven from any suitable source of power by a flexible shaft 12, it being understood that any suitable cutting tool may be used.

The frame of the machine includes at each end thereof a pair of clamping jaws, 3 and 4, which serve both to clamp the work 5 and as supports or legs. Wood screws 6, extending through lugs on the jaws 3 and 4 may be screwed into the bench or floor to properly steady the machine. The clamping jaws 3, 4, of each pair, are joined together near their upper ends by two parallel side-bars, 14 and 15, arranged one above the other and passing freely through the clamping jaws. The two side-bars 14 and 15 of each pair are joined together at their rear ends by a vertical yoke 9 rigidly secured to them and provided with adjusting screws 8 having handles and threaded through the yoke and abutting against the rear face of the clamping jaw 4 for adjustment of that jaw. The adjustment of the front jaw 3 of each pair is effected by means of pins 7, passing through holes in the front clamping jaw, and each passing through one of a series of holes in its corresponding side-bar, 14 or 15, the coarseness of this adjustment of the front clamping jaw of each pair being compensated by the fine adjustment of its opposed rear clamping jaw.

The two side-bars 14 and 15 of each pair of side-bars are also joined together between the clamping jaws by an adjustable yoke 16 fitting loosely on the side-bars and locked in desired position by a set screw 17 abutting against the upper side-bar, and these adjustable yokes receive and adjustably support the ends of the cross-bar 13 in bushings 18 fitted in the yokes, the cross-bar having a longitudinal spline or key-way 20, and feathers 21 being fixed in the bushings 18 and seated in the spline, and a set screw 22 being provided in each bushing and abutting against the feather of that bushing, to lock the cross-bar to the bushing against longitudinal movement. Obviously the splines and feathers prevent any rotative movement between the cross-bar and its bushings. The bushings 18 are shouldered to fixedly hold them against longitudinal movement in the adjustable yokes 16, and are adjustably held against rotation by set screws 19 in lugs on the yokes.

The saw 11 is suspended from the cross-bar 13 on a vertical tool-supporting bar 31, which is connected to the cross-bar 13 by a bracket 32. For lateral adjustment of the saw, and also to permit the tool-bar 31 and the saw 11 to oscillate on the cross-bar 13 as a center, the bracket 32 is provided with a horizontal bore for the reception of the cross-bar 13 and a shouldered bushing 33 around the bar 13; and for adjusting the tool-bar 31 longitudinally, to shorten the radius of rotation, the bracket 32 is provided with another bore at right angles to the first for the reception of the tool-bar 31 and a shouldered bushing 34. A feather 35 is provided in the bushing 33 and seated in the spline 20 of the cross-bar 13, and a set screw 36 in the bushing 33 abuts against the feather 35 and locks the bushing and the cross-bar together, and prevents lateral movement of the saw; and a set screw 37, threaded through a lug on the bracket 32, abuts against the bushing 33, to lock the bracket to the bushing 33 when it is desired to prevent the saw and its tool-bar 31 from oscillating on the cross-bar 13. To hold the supporting bar 31 from turning or rotating in the bushing 34, the tool-bar 31 is also provided with a longitudinal spline 38, and a feather 39 in the bushing 34 extends into the spline 38, and a set screw 40 abuts against the feather 39 and serves to lock together the bushing and the tool-bar 31, and, when loosened, permits longitudinal adjustment of the tool-bar 31 to shorten the radius of rotation or oscillation. Also a set screw 41 is threaded through the bracket 32 and abuts against the bushing 34 and serves to lock the bushing 34 and the bracket 32 together, to prevent rotation of the bushing 34 and the supporting bar 31 which is keyed thereto.

The saw 11 is carried in a frame 42, which is provided with front and side handles 43 for manually directing the operation of the saw. The saw frame 42 is connected to the supporting bar 31 by grooved projections fitting over a T-shaped guide 44 on the end of the bar 31, which extends perpendicular to the bar in the plane of its rotation or oscillation, thus providing means in addition to the adjustment of the cross-bar 13 for adjusting the saw to and from the work 25. Set screws 45 are threaded into the grooved projections of the frame 42 and abut against the guide 44 to lock the saw in the desired position.

In Fig. 1 I have shown my machine in operation cutting dentils in a cornice stone. After the machine has been set in its proper position relative to the work, the saw is adjusted in a horizontal plane to or from the work by loosening the set screws 17 and adjusting the yokes 16 and the cross-bar 13 and the parts carried by it longitudinally of the side-bars 14 and 15, while a slight adjustment in this direction may be obtained by loosening the set screws 45 and adjusting the saw and frame 42 along the guide 44. The clamping jaws 3 and 4 may be adjusted according to the length of the work by loosening the set screws 22 and moving the end supports along the cross-bar 13. Adjustment of the saw in a vertical plane is obtained by loosening the set screw 40 and moving the tool-bar 31 up or down through the bushing 34 in the bracket 32. Proper lateral adjustment is then obtained by loosening the set screw 36, thus releasing the feather 35 in the spline 20, and then moving the bracket 32 and the parts carried by it along the cross-bar 13. With the set screw 37 released, the bracket 32 is free to turn on the bushing 33 and the saw may now be oscillated and brought in contact with the work in the proper position. After one dentil groove is cut, the bracket 32 is adjusted the proper distance along the cross-bar 13 to bring the saw in position for the next cut.

It is evident that by setting the screw 37 and thus locking the bracket 32 and the tool-bar 31 from rotation on the bar 13, and releasing the set screw 41 and turning the tool-bar 31 and the saw at right angles to the position shown in the drawings and setting the screw 41 again, and then loosening the set screw 36, leaving the bracket free to be moved along the cross-bar 13, the machine may be utilized to cut channels or grooves longitudinally of the work. It is obvious that numerous other combinations of parts and movements may be employed with a machine embodying my invention and that various modifications may also be made in the construction shown and above particularly described within the principle and scope of my invention.

I claim:

1. A stone-cutting machine comprising the combination of a cutting tool, a supporting frame, a tool carrier mounted to have rotative movement thereon and adapted to receive a horizontal, vertical and lateral adjustment, and means for adjusting the cutting tool in the plane of rotation independently of the adjustment of the tool carrier.

2. A stone-cutting machine comprising the combination of a cutting tool, a cross-bar and end supports therefor, a tool carrier connected so as to have rotative movement relatively to the cross-bar and adapted to receive a horizontal, vertical and lateral adjustment, and means for adjusting the cutting tool in the plane of rotation independently of the adjustment of the tool carrier.

3. A stone-cutting machine comprising the combination of a cutting tool, a cross-bar, a tool-supporting bar mounted to have rotative movement relative to the cross-bar and adjustable longitudinally of the cross-bar and transversely thereof to vary the length of the radius of rotation, and a tool carrier mounted on the end of the tool-supporting bar and adjustable thereon at right angles thereto in the plane of rotation.

4. A stone-cutting machine comprising the combination of a cutting tool, a cross-bar and horizontal end supports therefor, the cross-bar being adjustable longitudinally of its supports, a tool-supporting bar mounted to have rotative movement relative to the cross-bar and adjustable longitudinally of the cross-bar and transversely thereof to vary the length of the radius of rotation, and a tool carrier mounted on the end of the tool-supporting bar and adjustable thereon at right angles thereto in the plane of rotation.

5. A stone-cutting machine comprising, in combination with a cutting tool, a cross-bar, a bracket mounted to rotate thereon and adjustable longitudinally thereof, a tool-supporting bar supported in the bracket substantially perpendicular to the cross-bar and adjustable longitudinally in its support to vary the length of the radius of rotation, and a tool carrier mounted on the end of the tool-supporting bar and adjustable thereon at right angles thereto in the plane of rotation.

6. A stone-sawing machine comprising the combination of a saw, a cross-bar and end supports therefor, a bracket mounted to rotate on the cross-bar and adapted to be adjusted longitudinally thereof, a tool-bar supported in the bracket substantially perpendicular to the cross-bar and longitudinally adjustable in the bracket, and a saw carrier supported on the tool-bar and adjustable thereon at a right angle thereto in the plane of rotation of the saw.

7. A stone-sawing machine comprising the combination of a saw, a cross-bar and end supports therefor extending substantially at right angles thereto, the cross-bar being adjustable longitudinally of the supports, a bracket mounted to rotate on the cross-bar and adapted to be adjusted longitudinally thereof, a tool-bar supported in the bracket substantially perpendicular to the cross-bar and longitudinally adjustable in the bracket, and a saw carrier supported on the tool-bar.

8. A stone-sawing machine comprising the combination of a saw, a cross-bar and end supports therefor extending substantially at right angles thereto, the horizontal bar being adjustable longitudinally of the supports, a bracket mounted to rotate on the cross-bar and adapted to be adjusted longitudinally thereof, a tool-bar supported in the bracket substantially perpendicular to the cross-bar and longitudinally adjustable in the bracket, and a saw carrier supported on the tool-bar and adjustable thereon at a right angle thereto in the plane of rotation of the saw.

9. A stone-sawing machine comprising the combination of a rotary saw, two sets of side-bars having clamping jaws thereon, a supporting yoke on each set of side-bars and adjustable longitudinally thereof, a cross-bar connecting the two sets of side-bars and adjustably supported in the yoke thereon, a bracket mounted to rotate on the cross-bar and adapted to be adjusted longitudinally thereof, a tool-bar supported in the bracket substantially perpendicular to the cross-bar and longitudinally adjustable in the bracket, and a saw carrier supported on the tool-bar.

10. A stone-sawing machine comprising the combination of a rotary saw, two sets of side-bars having clamping jaws thereon, a supporting yoke on each set of side-bars and adjustable longitudinally thereof, a cross-bar connecting the two sets of side-bars and adjustably supported in the yokes thereon, a bracket mounted to rotate on the cross-bar and adapted to be adjusted longitudinally thereof, a tool-bar supported in the bracket substantially perpendicular to the cross-bar and longitudinally and rotatively adjustable in the bracket, and a saw carrier supported on the tool-bar and adjustable thereon at a right angle thereto in the plane of rotation of the saw.

In testimony whereof I have affixed my signature in presence of two witnesses.

WILLARD F. MEYERS.

Witnesses:
  BERNARD COWEN,
  VICTOR D. BORST.